United States Patent [19]
Athmer et al.

[11] Patent Number: 4,969,542
[45] Date of Patent: Nov. 13, 1990

[54] DUST SHIELD FOR A DAMPER

[75] Inventors: Merle J. Athmer, Kettering; Chris F. Keller, Jr., Dayton, both of Ohio

[73] Assignee: General Motors Corporation, Detroit, Mich.

[21] Appl. No.: 380,244

[22] Filed: Jul. 17, 1989

[51] Int. Cl.$^5$ .............................................. B60G 7/02
[52] U.S. Cl. ................................ 188/322.12; 267/220
[58] Field of Search .................... 188/322.12; 267/195, 267/219, 220

[56]  References Cited
U.S. PATENT DOCUMENTS

| | | | |
|---|---|---|---|
| 2,708,112 | 5/1955 | Seddon et al. | 267/220 |
| 3,844,314 | 10/1974 | Chadwick | 138/109 |
| 3,907,080 | 9/1975 | Chadwick | 188/322 |
| 4,114,460 | 9/1978 | Oto | 188/322.12 |
| 4,235,426 | 11/1980 | Sullivan, Jr. et al. | 267/220 |
| 4,462,608 | 7/1984 | Lederman | 267/220 |
| 4,529,213 | 7/1985 | Goodman | 188/322.12 |
| 4,568,067 | 2/1986 | Iwata | 267/220 |
| 4,771,996 | 9/1988 | Martinez, Jr. et al. | 267/220 |

FOREIGN PATENT DOCUMENTS 1902019  8/1970  Fed. Rep. of Germany.

Primary Examiner—Matthew C. Graham
Attorney, Agent, or Firm—A. Michael Tucker

[57]  ABSTRACT

A dust shield for use with a damper includes a hollow cylindrical body having first and second ends. A plurality of convolutions are provided in the outer surface of the body between its ends. A plurality of inwardly projecting fingers are provided in the body portion. Each finger includes a centering rib extending to the damper to prevent shifting of the dust shield during use, thereby eliminating contact between the dust shield and a surrounding coil spring or a bump plate mounted on the damper. Additionally, each finger includes a retaining wall. The bump plate engages the retaining wall during rebound of the damper to pull the dust shield to its approximate original length to provide full-time cover of a piston rod of the damper.

8 Claims, 2 Drawing Sheets

DUST SHIELD FOR A DAMPER

BACKGROUND OF THE INVENTION

1. Field of the Invention

The present invention relates generally to a damper for a vehicle, and more particularly is directed to a dust shield for use with a damper.

2. Description of the Related Art

Dampers, e.g. shock absorbers or struts, for suspension systems in automobiles are well-known. In order to protect a damper and its seals from contaminants such as dirt, gravel, etc., dust shields have been utilized with dampers. Generally, a dust shield is a molded member formed from rubber or the like and includes a hollow cylindrical body which is slipped over an upper end of a damper. The dust shield is retained about the damper in any suitable manner. Many dust shields include a portion of inner and outer convolutions on the outer surface of the dust shield. Such convolutions provide a spring-like effect by permitting the dust shield to be compressed when the damper is in compression and causing the dust shield to expand to its approximate original length during rebound of the damper.

In many vehicle suspension systems, a coil spring surrounds the damper and its accompanying dust shield. During compression and rebound of the damper, the dust shield may shift from side to side about the longitudinal axis of the damper. When shifted, the outer surface and its convolutions, if any, can engage the coil spring, thereby causing excessive wear of the dust shield and wear of any coatings that may be provided on the coil spring. The inner surface and its convolutions, if any, can rub against the damper when the dust shield is shifted, thereby causing unwanted noise and excessive wear.

After repeated use and/or long exposure to the environment, conventional dust shields may tend to lose their resiliency and ability to return to their approximate original length after compression of the damper. This shortening effect of a dust shield, commonly referred to as compression set, may expose portions of the damper to contaminants, thereby decreasing the effectiveness of the dust shield.

SUMMARY OF THE INVENTION

The present invention includes a dust shield for use with a damper. The dust shield is formed from a molded tubular member and includes a plurality of convolutions to provide a spring-like effect in the dust shield. The dust shield includes a plurality of inwardly projecting fingers having ribs which center the dust shield on a damper. The centering ribs prevent the dust shield from substantial shifting during compression and rebound of the damper, thereby eliminating contact between the dust shield and a surrounding coil spring or a bump plate mounted on the damper. Furthermore, the ribs force the dust shield to expand to its approximate original length during rebound of the damper to provide full-time cover of a piston rod of the damper. The present dust shield can be utilized with conventional shock absorbers and struts.

In a preferred embodiment, the present invention includes a dust shield for use with a damper. The dust shield includes a hollow cylindrical body having first and second ends. A plurality of convolutions are provided in the outer surface of the body between its ends. A plurality of inwardly projecting fingers are provided in the body portion. Each finger includes a centering rib extending to the damper to prevent shifting of the dust shield, thereby eliminating contact between the dust shield and a surrounding coil spring or a bump plate mounted on the damper. Additionally, each finger includes a retaining wall. The bump plate engages the retaining wall during rebound of the damper to pull the dust shield to its approximate original length to provide full-time cover of a piston rod of the damper.

DESCRIPTION OF THE PREFERRED EMBODIMENTS

Figure 1:
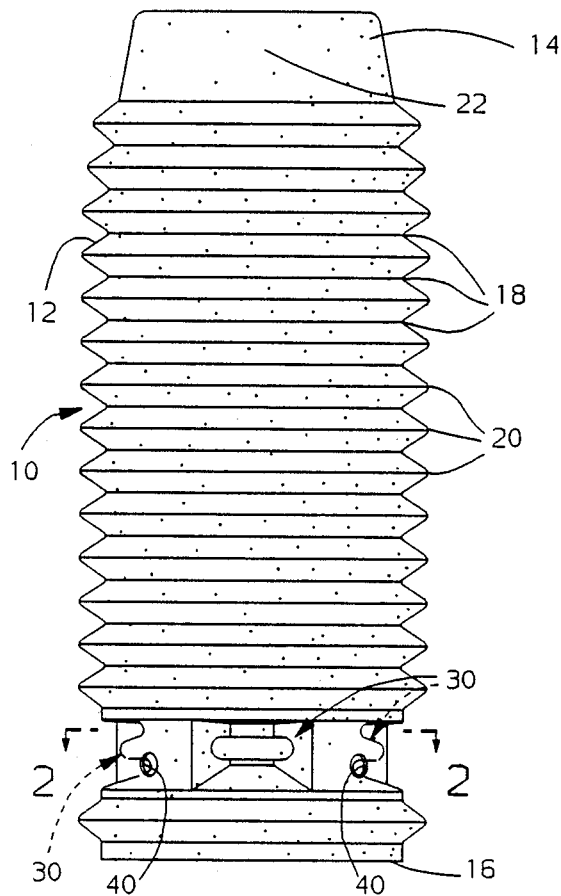
FIG. 1 is a side elevational view of a dust shield of the present invention illustrating a plurality of inwardly projecting fingers in the body portion of the dust shield.
Figure 3:
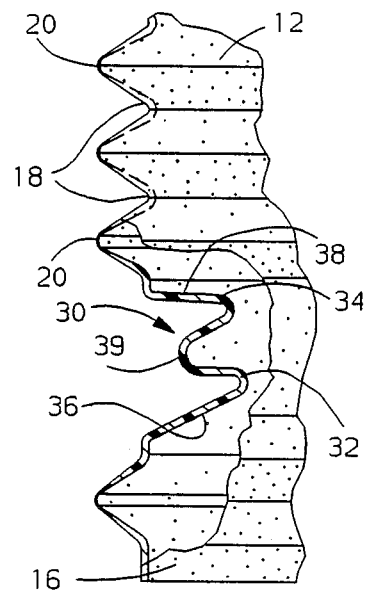
FIG. 3 is an enlarged partially sectional view of an inwardly projecting finger of the dust shield of FIG. 1 illustrating the centering rib and the retaining rib of a finger.
Figure 2:
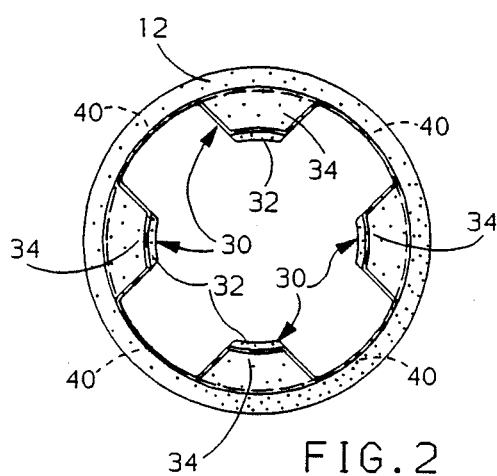
FIG. 2 is a sectional view taken along line 2—2 of FIG. 1 illustrating the inwardly projecting fingers.

A first preferred embodiment of the dust shield of the present invention, indicated generally at 10, is illustrated in FIGS. 1-3. The dust shield 10 includes a hollow cylindrical body 12 and a first or upper end 14 and a second or lower end 16. Preferably, the dust shield 10 is formed as a molded tubular member and includes a plurality of inner convolutions 18 and outer convolutions 20 on its outer surface which provide a spring-like effect for the body 12. When the first and second ends 14 and 16 are compressed toward one another, the convolutions 18 and 20 permit the body 12 to yieldably compress and then expand to its approximate original length when the compression force is removed. Preferably, the first end 14 includes a conical portion 22 having a central opening to receive a piston rod of a damper as described below.

Preferably near the second end 16 of the body 12, a plurality of inwardly projecting fingers 30 are provided in the outer surface of the body 12. In the embodiment in FIGS. 1-3, four fingers 30 (illustrated in FIG. 2) are equally spaced around the circumference of the body 12. In other embodiments of the dust shield 10, various numbers of fingers 30 can be provided. Preferably, each finger 30 is molded into the body 12.

Each finger 30 includes a first or centering rib 32 and a second or retaining rib 34 as illustrated best in FIG. 3. The centering rib 32 projects inwardly toward the axis of the body 12 a greater distance than the inward projection of the retaining rib 34 and engages a damper as described below. Preferably, an angled ramp 36 connects the outer surface of the body 12 with the centering rib 32. A retaining wall 38 oriented approximately perpendicular to the axis of the body 12 connects the retaining rib 34 to the outer surface of the body 12 opposite the ramp 36. A substantially C-shaped connecting wall 39 connects the centering rib 32 with the retaining rib 34.

If desired, a plurality of vents 40 can be provided on the outer surface of the body 12 interspaced between the fingers 30. Vents 40 can be provided by any suitable means. As described below, vents 40 permit the passage of air as the body 12 is compressed and expanded.

Figure 4:
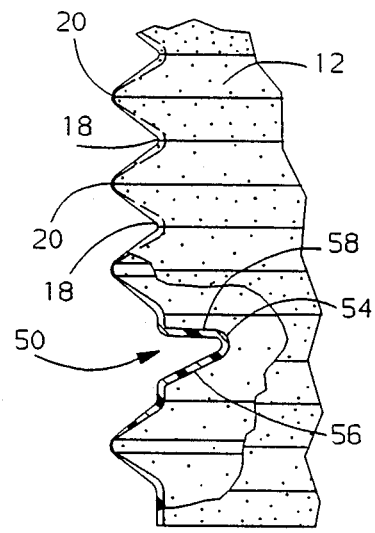
FIG. 4 is an enlarged, partially sectional view of a second preferred embodiment of the present dust shield illustrating an inwardly projecting finger having a single rib for centering and retention of the dust shield.

In a second preferred embodiment illustrated only in FIG. 4, the body 12 includes a plurality of inwardly projecting fingers 50 provided in the outer circumference of the body 12 having only a first or retaining rib 54 which engages a damper as described below. Preferably, an angled ramp 56 connects the outer surface of the body 12 with the lower portion of each rib 54. A retaining wall 58 oriented approximately perpendicular to the axis of the body 12 connects the upper portion of each rib 54 to the outer surface of the body 12 opposite the ramp 56.

Figure 5:
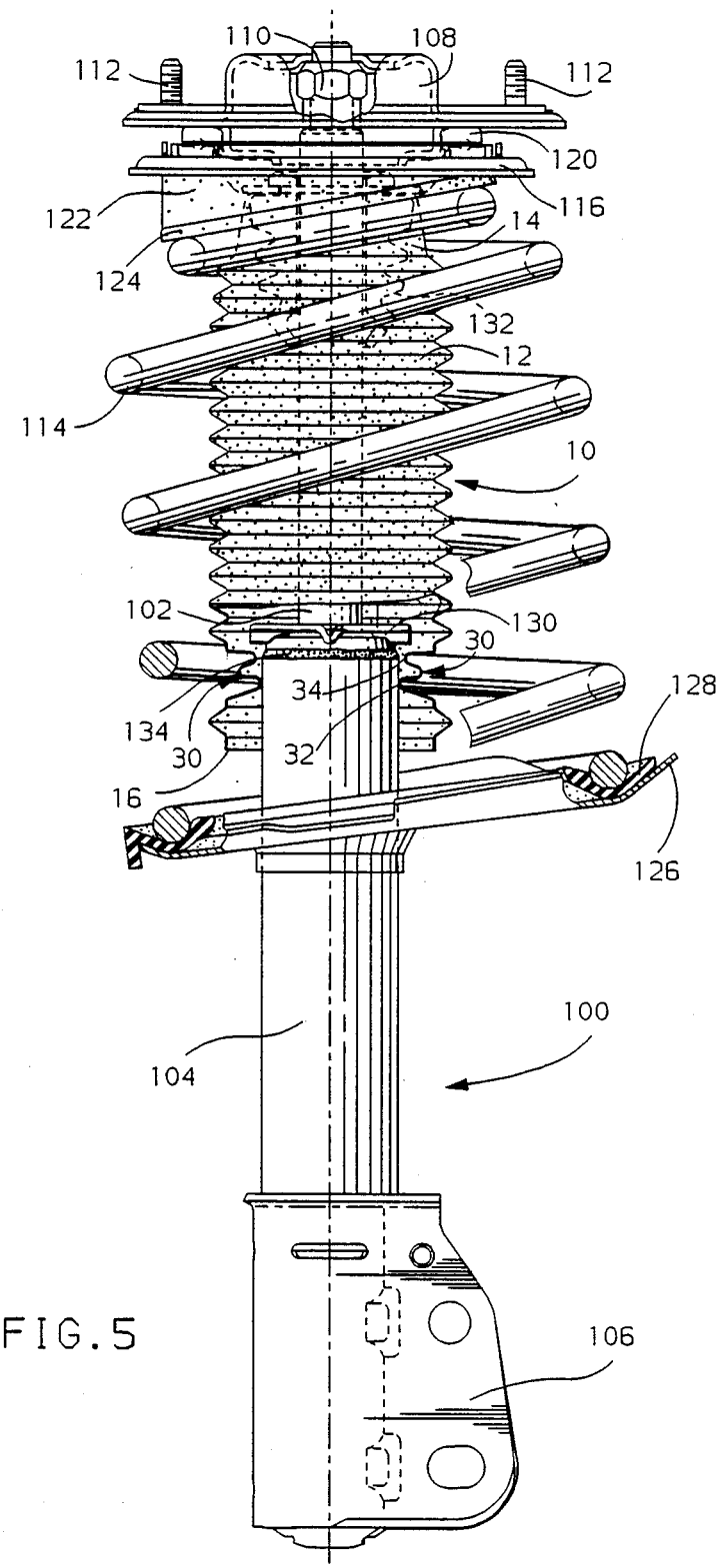
FIG. 5 is a side elevational view of the dust shield of FIG. 1 mounted on a conventional damper.

For use, the dust shield 10 is inserted over an upper portion of a damper assembly 100 as illustrated in FIG. 5. Damper assembly 100 can comprise a shock absorber or strut and includes a telescoping piston rod 102 received into an upper end of a reservoir tube 104 in a well-known manner. A piston assembly (not illustrated) is mounted on the piston rod 102 and reciprocates internally within the reservoir tube 104.

The lower end of the reservoir tube 104 is received in a bracket 106 and connected to a support structure of an automobile. The upper end of the piston rod 102 is retained in a mount assembly 108 by a nut 110. Fasteners 112 provide for connection of the mount assembly 108 to a support structure in a vehicle in a well-known manner.

A coil spring 114 is seated at its upper end at an upper spring seat 116. A bearing 120 can be provided between the mount assembly 108 and the upper spring seat 116 to provide for rotation of the damper assembly 100 if desired. Furthermore, a spacer 122 and an insulator 124 can be inserted between the coil spring 114 and the upper spring seat 116. The lower portion of the coil spring 114 is seated on a lower spring seat 126. If desired, an insulator 128 can be provided between the coil spring 114 and the lower spring seat 126.

A disk-like bump plate 130 having a central opening for receiving the piston rod 102 is mounted on an upper end of the reservoir tube 104. The diameter of the bump plate 130 is less than the diameter of the inner convolutions 18 of the dust shield 10. A jounce bumper 132 formed from a resilient material such as rubber is provided at an upper end of the piston rod 102.

To install the dust shield 10, the second end 16 of the dust shield 10 is inserted over the piston rod 102 and forced past the bump plate 130 and onto the reservoir tube 104 until the fingers 30 are positioned below the bump plate 130. Ramps 36 facilitate the passage of the fingers 30 past the bump plate 130. The first end 14 of the dust shield 10 is secured at the upper end of the jounce bumper 132 in any conventional manner. After installation of the dust shield 10, each retaining wall 38 is approximately parallel with a lower surface of the bump plate 130.

In operation, damper assembly 100 compresses as the piston rod 102 is received in the reservoir tube 104. During compression of the damper assembly 100, the convolutions 18 and 20 permit the dust shield 10 to be resiliently compressed. For example, in the view illustrated in FIG. 5, the reservoir tube 104 and the attached lower spring seat 126 will move upwardly toward the upper spring seat 116. As the lower spring seat 126 engages the second end 16 of the dust shield 10, the convolutions 18 and 20 permit the compression of the body 12. During rebound of the damper assembly 100, the lower surface of the bump plate 130 engages the retaining walls 38 thereby pulling the second end 16 downwardly so that the dust shield 10 expands to its approximate original length. During rebound of the damper assembly 100, vents 40 permit the passage of air into the area between the dust shield 10 and the damper assembly 100 as the dust shield 10 expands.

During use of the dust shield 10, the centering ribs 32 project inwardly and engage the reservoir tube 104 to center the lower end 16 of the dust shield 10 about the reservoir tube 104. Preferably, the centering ribs 32 engage the reservoir tube 104 below a rough weld area 134 on the outer surface of the reservoir tube 104 to avoid accelerated wear of the ribs 32. In damper assemblies where a rough weld area 134 is not present, a dust shield having fingers 50 with a single rib 54 (FIG. 4) will provide both the retaining and centering functions described above. Centering the dust shield 10 during use eliminates contact between the outer convolutions 20 and the spring 114, as well as contact between the inner convolutions 18 and the bump plate 130.

The present dust shield 10 having a plurality of retaining fingers 30 or 50 provides continuous cover of the piston rod 102 during compression and rebound of the damper assembly 100. The present retaining walls 38 and 58 provided in fingers 30 and 50, respectively, pull the second end 16 of the dust shield 10 downwardly during rebound of the damper assembly 100 to overcome the compression set of the present dust shield 10. Furthermore, the fingers 30 or 50 center the dust shield 10 on the damper assembly 100 to eliminate contact between the dust shield 10 and the spring 114 and the dust shield 10 and the bump plate 130.

Although the present invention has been described with reference to preferred embodiments, persons skilled in the art will recognize that changes may be made in form and detail without departing from the spirit and scope of the invention.

The embodiments of the invention in which an exclusive property or privilege is claimed are defined as follows:

1. A dust shield for use with a damper having a bump plate mounted on the damper, the dust shield comprising:
   (a) a tubular member having a hollow cylindrical body portion and first and second ends; and
   (b) a plurality of radially inwardly projecting fingers provided in the body portion wherein each finger projects beyond the outer diameter of the bump plate and includes
      (i) a first rib having a retaining wall approximately parallel with a lower surface of the bump plate for engagement with the bump plate lower surface during rebound of the damper, and
      (ii) a second rib provided below the first rib for full-time centering engagement with the damper.

2. The dust shield as specified in claim 1 including a plurality of convolutions provided in the outer surface of the body portion between its ends.

3. The dust shield as specified in claim 1 including a plurality of vents provided in the outer surface of the body portion between the fingers.

4. The dust shield as specified in claim 1 wherein an angled ramp connects each second rib with the outer surface of the body portion.

5. A vehicle damper assembly comprising:

(a) a telescopic damper having a piston rod extending from a first end;
(b) a bump plate secured to the first end of the damper and having an opening for receiving the piston rod; and
(c) dust shield means for covering the extended piston rod, the dust shield means having
  (i) a hollow cylindrical body having first and second ends,
  (ii) means for mounting the first end of the body in a fixed relationship with respect to the piston rod, and
  (iii) rib means provided adjacent the second end of the body and extending radially inwardly toward the axis of the body, the rib means including a first rib having a retaining wall oriented approximately parallel with a lower surface of the bump plate for engagement with the bump plate lower surface during rebound of the damper and a second rib provided below the first rib for full-time centering engagement with the damper.

6. The vehicle damper assembly as specified in claim 5 wherein an angled ramp connects the second rib with the outer surface of the body.

7. The vehicle damper assembly as specified in claim 5 including a plurality of vents provided in the outer surface of the body between the rib means.

8. The vehicle damper assembly as specified in claim 5 including a plurality of convolutions provided in the outer surface of the body between the first and second ends.

* * * * *